US008612745B2

(12) United States Patent  (10) Patent No.: US 8,612,745 B2
Oseto et al.                    (45) Date of Patent:   Dec. 17, 2013

(54) AUTHENTICATION TICKET PROCESSING APPARATUS AND METHOD WITH IMPROVED PERFORMANCE FOR SELF-CONTAINED TICKET

(75) Inventors: Futoshi Oseto, Kanagawa (JP); Kensaku Yamamoto, Saitama (JP); Jun Kawada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1503 days.

(21) Appl. No.: 11/561,070

(22) Filed: Nov. 17, 2006

(65) Prior Publication Data

US 2007/0118734 A1   May 24, 2007

(30) Foreign Application Priority Data

Nov. 22, 2005  (JP) ................................ 2005-336871
Nov. 9, 2006   (JP) ................................ 2006-304257

(51) Int. Cl.
    *H04L 29/06*           (2006.01)
(52) U.S. Cl.
     USPC ........................... 713/155; 713/158; 713/159
(58) Field of Classification Search
     USPC ........ 713/150, 155, 159; 726/1–4, 16–20, 26, 726/27
     See application file for complete search history.

(56) References Cited

U.S. PATENT DOCUMENTS

| 5,680,612 | A | 10/1997 | Asada et al. |
| 6,097,797 | A | 8/2000 | Oseto |
| 6,230,189 | B1 | 5/2001 | Sato et al. |
| 7,461,081 | B2 * | 12/2008 | Matsuda et al. ............... 707/102 |
| 2004/0006555 | A1 | 1/2004 | Yamamoto et al. |
| 2004/0080771 | A1 * | 4/2004 | Mihira et al. ................. 358/1.13 |
| 2004/0148186 | A1 * | 7/2004 | Kawashima et al. ............. 705/1 |
| 2004/0233897 | A1 * | 11/2004 | Yamaguchi et al. .......... 370/352 |
| 2004/0260709 | A1 | 12/2004 | Matsuno et al. |
| 2005/0015711 | A1 | 1/2005 | Yamamoto et al. |
| 2005/0091600 | A1 | 4/2005 | Yamamoto et al. |
| 2005/0125378 | A1 | 6/2005 | Kawada |
| 2006/0095831 | A1 | 5/2006 | Kawada et al. |
| 2007/0088665 | A1 * | 4/2007 | Sakoh et al. ....................... 707/1 |

FOREIGN PATENT DOCUMENTS

JP       2004-135291        4/2004

(Continued)

OTHER PUBLICATIONS

U.S. Appl. No. 08/882,242, filed Jun. 25, 1997.
U.S. Appl. No. 10/434,037, filed May 8, 2003, Fumihiko Sato.
"Websphere Application Server Caching Proxy Administration Guide", IBM Japan, Ltd., May 2005, Version 6.0.2, first edition, pp. 75-76 pp. 197-198 (with partial English translation).

(Continued)

*Primary Examiner* — Taghi Arani
*Assistant Examiner* — Jahangir Kabir
(74) *Attorney, Agent, or Firm* — Oblon, Spivak, McClelland, Maier & Neustadt, L.L.P.

(57) ABSTRACT

An authentication ticket processing apparatus includes a temporary data storage unit configured to keep user information upon receiving the user information from a user management database for managing user information, the temporary data storage unit allowing access thereto to be performed at higher speed than access to the user management database. The authentication ticket processing apparatus is configured such that, when there is a need to acquire user information in response to a decoding request from a server, a check is made whether user information corresponding to the decoding request is present in the temporary data storage unit, and the corresponding user information is acquired from the temporary data storage unit if the corresponding user information is present in the temporary data storage unit.

12 Claims, 21 Drawing Sheets

(56) References Cited

FOREIGN PATENT DOCUMENTS

| | | |
|---|---|---|
| JP | 2005-56393 | 3/2005 |
| JP | 2005-62556 | 3/2005 |
| JP | 2005-70979 | 3/2005 |
| WO | WO 2004/010271 | 1/2004 |
| WO | WO 2005/033954 A1 | 4/2005 |

OTHER PUBLICATIONS

Office Action issued Dec. 13, 2011 in Japanese Application Serial No. 2006-304257.

* cited by examiner

AUTHENTICATION TICKET PROCESSING APPARATUS AND METHOD WITH IMPROVED PERFORMANCE FOR SELF-CONTAINED TICKET

BACKGROUND OF THE INVENTION

1. Field of the Invention

The present invention relates to an authentication-ticket processing apparatus that can speed up the acquisition of user information.

2. Description of the Related Art

Authentication tickets may be used in order for a server on a network to provide prompt, safe services.

There are various specifications for authentication tickets depending on their usage. One of such specifications relates to an authentication ticket referred to as a "self-contained ticket", which returns user information at the time of decoding process.

FIG. 1 is a drawing showing the flow of related-art processes from an authentication request to the acquisition of an authentication ticket. Prior to the receiving of services from a service server 2, a client 1 issues an authentication request to a user authentication apparatus (UAUD: User Authentication by User Directory) 3 (step S1). The user authentication apparatus 3 checks user information with a user management database 4 (step S2). Upon confirmation, the user authentication apparatus 3 only obtains user ID information from the user management database 4 (step S3). The user authentication apparatus 3 then generates an authentication ticket based on the user ID information (step S4), and supplies the authentication ticket to the client 1 (step S5).

FIG. 2 is a drawing showing the flow of related-art processes from a service request to the start of a service. The client 1 issues a service request together with the authentication ticket to the service server 2 (step S11). In response, the service server 2 issues a decoding request to the user authentication apparatus 3 to decode the authentication ticket (step S12). The user authentication apparatus 3 acquires user information (inclusive of information other than the user ID information) from the user management database 4 (steps S13, S14), and, then, supplies the user information to the service server 2 (step S15). Based on the supplied user information, the service server 2 makes a decision about the access right regarding the relevant service so as to start providing the service (step S16).

Patent Document 1 discloses an image forming apparatus, an accumulated document management method, and an accumulated document processing system that can share an authentication function regarding accumulated documents, and that can supply accumulated documents without squandering the resources of the network and the resources of the multifunction machine.

[Patent Document 1] Japanese Patent Application Publication No. 2004-135291

In the configuration of FIG. 2, the service server 2 issues a decoding request to the user authentication apparatus 3 each time it receives a new service request together with an authentication ticket even if the authentication ticket is the same as one that was previously received, and the user authentication apparatus 3 acquires user information from the user management database 4 accordingly. Such arrangement is made because, in the case of a self-contained ticket, the registration status of the user may change over a long time period during which the authentication ticket is kept in possession, resulting in a situation in which the user information at the time of a decoding process may end up differing from the user information as existed at the time of authentication. When a document is to be delivered or printed in a workflow, for example, the user may encounter a wait state at the start of operation. The time at which the function will exit from the waiting state to become operational is unknown. Because of this, an authentication ticket that is to be used after the resumption should be valid for a sufficiently long time period. There may be situations, however, in which the user information as existed at the time of authentication is different from the current user information when the function becomes available, due to assignment to another post in the organization, leave of absence, requirement from the company, or the like. For this reason, provision is made to acquire user information from the user management database 4 at the time of decoding the authentication ticket to obtain the user information.

Since the related-art system is based on such arrangement as described above, if a plurality of services at the service server 2 use the same authentication ticket simultaneously, multiple decoding requests are issued to the user authentication apparatus 3 in a short interval (e.g., at an interval of few seconds). As a result, access to the database of the user management database 4 to obtain the same user information is performed multiple times in a short interval. FIG. 3 is a drawing showing the way in which authentication ticket decoding requests are frequently issued in the related-art arrangement. Multiple decoding requests are consecutively issued at short intervals from the service server 2 to the user authentication apparatus 3 (step S22). In response, the acquisition of user information from the user management database 4 is performed consecutively by the user authentication apparatus 3 (step S23).

In the related-art system as described above, when multiple decoding requests in respect of the same self-contained ticket are issued at short intervals, access to the database of the user management database 4 to obtain the same user information is performed multiple times accordingly, resulting in a performance drop.

This problem may have to be accepted as a compromise because it occurs due to the intended specification of the self-contained ticket. However, a change in user information that is supposed to be taken care of by such specification does not occur frequently. Treating such special case at the expense of performance may be considered as an action that lacks a sense of balance. Namely, user information regarding users using a document management system or the like is not frequently modified. If modified, such modification mainly occurs when there is an organizational change such as staff reassignment, and the frequency of such change may be few times a year to few times a month at the maximum. Accessing the database each time a decoding request is made in order to avoid trouble at such few occasions may be an overreaction.

Accordingly, there is a need for an authentication-ticket processing apparatus that can overcome the performance problem associated with the self-contained ticket, and that can speed up the acquisition of user information.

SUMMARY OF THE INVENTION

It is a general object of the present invention to provide an authentication-ticket processing apparatus and method that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description.

Objects as well as other features and advantages of the present invention will be realized and attained by an authentication-ticket processing apparatus and method particularly pointed out in the specification in such full, clear, concise, and exact terms as to enable a person having ordinary skill in the art to practice the invention.

To achieve these and other advantages in accordance with the purpose of the invention, the invention provides an authentication ticket processing apparatus for generating an authentication ticket for provision to a client in response to an authentication request from the client, and for supplying relevant user information in response to a decoding request from a server with respect to an authentication ticket associated with a service request from the client when the client is to receive a series of services from a plurality of servers that are operable independently of each other. The authentication ticket processing apparatus includes a temporary data storage unit configured to keep user information upon receiving the user information from a user management database for managing user information, the temporary data storage unit allowing access thereto to be performed at higher speed than access to the user management database. The authentication ticket processing apparatus is configured such that, when there is a need to acquire user information in response to a decoding request from a server, a check is made whether user information corresponding to the decoding request is present in the temporary data storage unit, and the corresponding user information is acquired from the temporary data storage unit if the corresponding user information is present in the temporary data storage unit.

According to another aspect of the present invention, the invention provides an authentication ticket processing method of generating an authentication ticket for provision to a client in response to an authentication request from the client, and of supplying relevant user information in response to a decoding request from a server with respect to an authentication ticket associated with a service request from the client when the client is to receive a series of services from a plurality of servers that are operable independently of each other. The aid authentication ticket processing method includes keeping user information in a temporary data storage unit upon receiving the user information from a user management database for managing user information, access to the temporary data storage unit being faster than access to the user management database, checking whether user information corresponding to a decoding request is present in the temporary data storage unit when there is a need to acquire user information in response to the decoding request from a server, and acquiring the corresponding user information from the temporary data storage unit if the corresponding user information is present in the temporary data storage unit.

In the authentication ticket processing apparatus according to at least one embodiment of the present invention, the temporary data storage unit that allows access thereto to be performed at higher speed than access to the user management database keeps user information upon receiving the user information from the user management database for managing user information, and the user information is acquired from the temporary data storage unit when there is a need to acquire the user information. This arrangement obviates the performance problem associated with the self-contained ticket, and speeds up the acquisition of user information.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

First Embodiment

Figure 1:
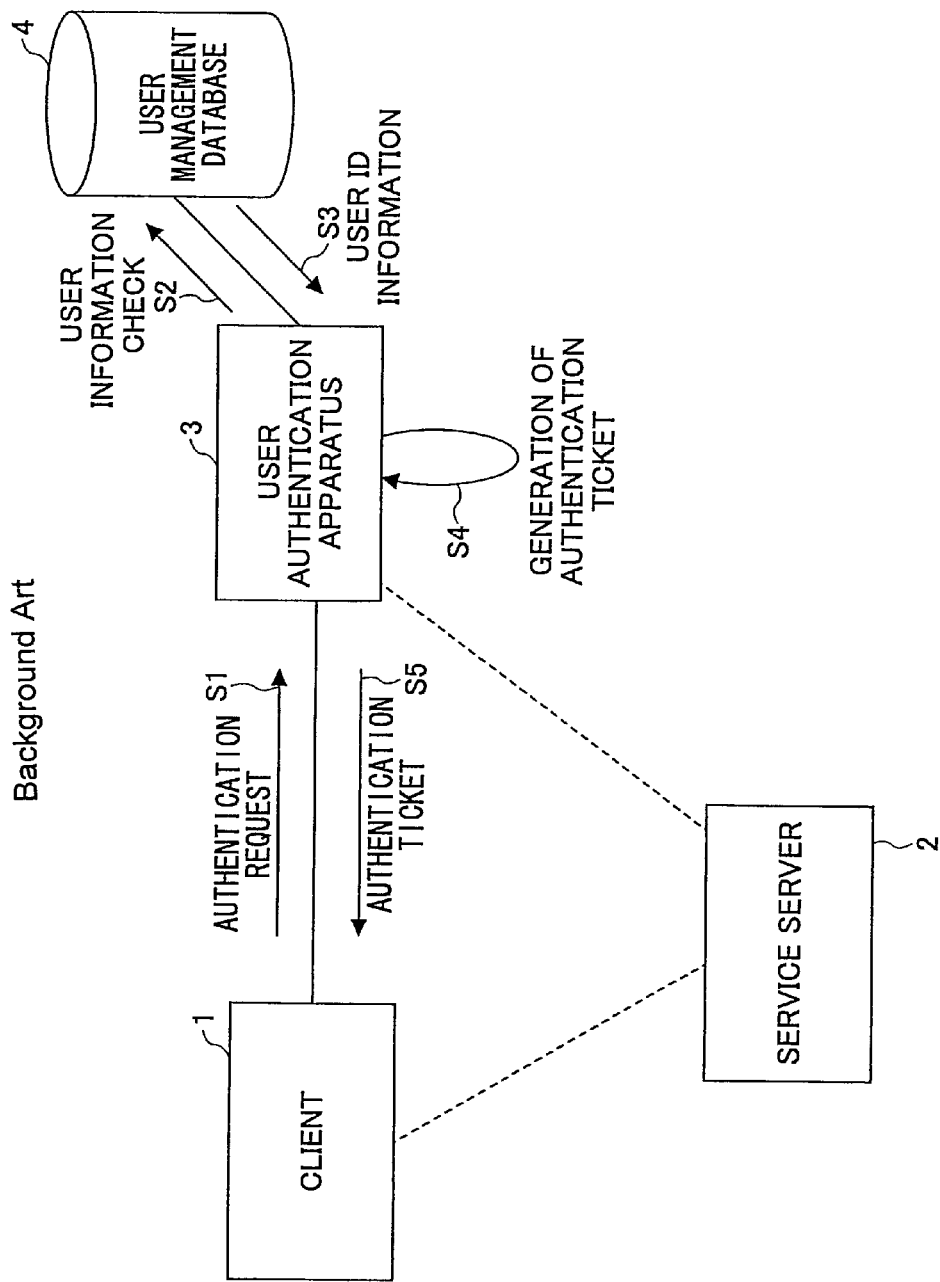
FIG. 1 is a drawing showing the flow of related-art processes from an authentication request to the acquisition of an authentication ticket.
Figure 2:
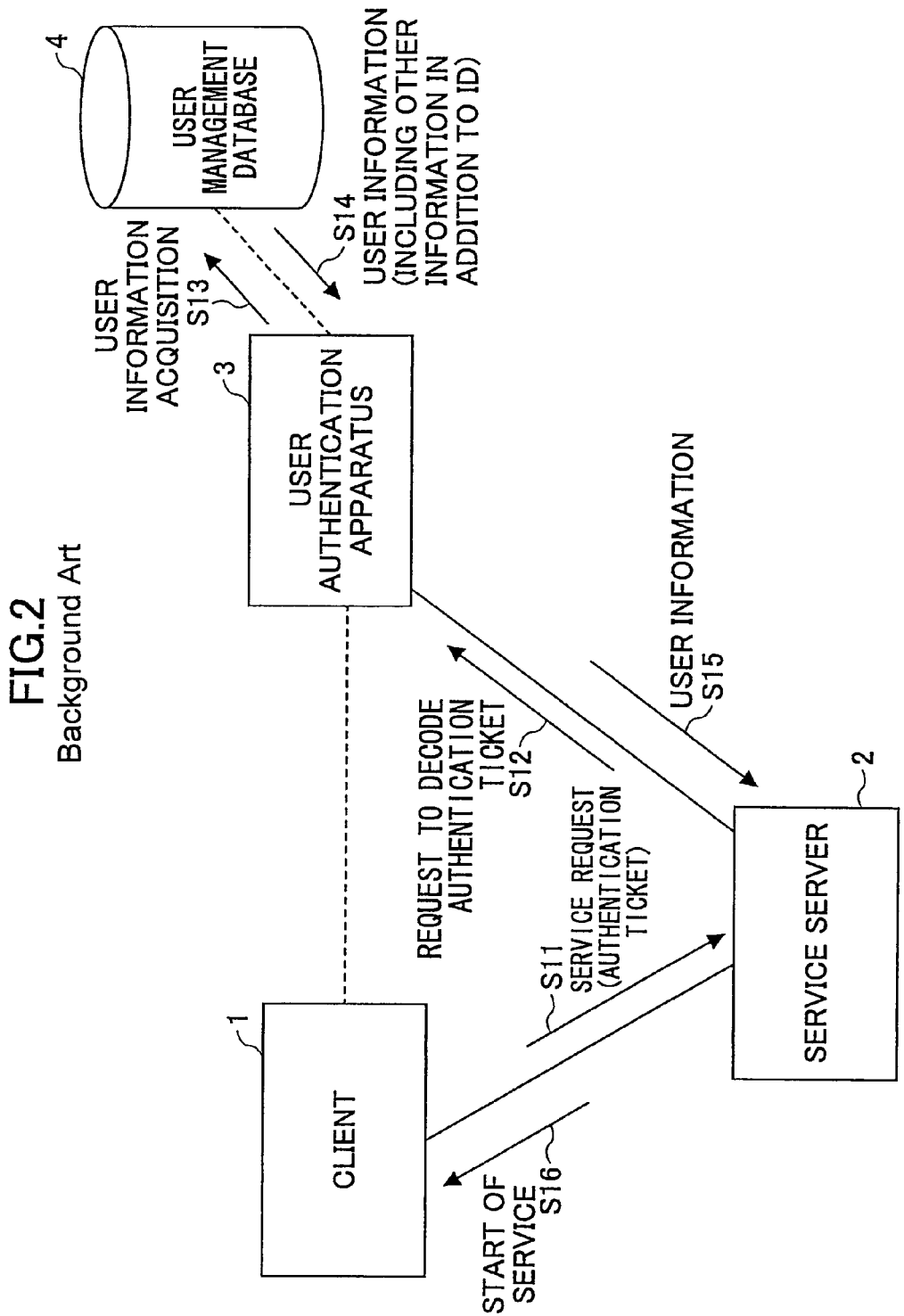
FIG. 2 is a drawing showing the flow of related-art processes from a service request to the start of a service.
Figure 3:
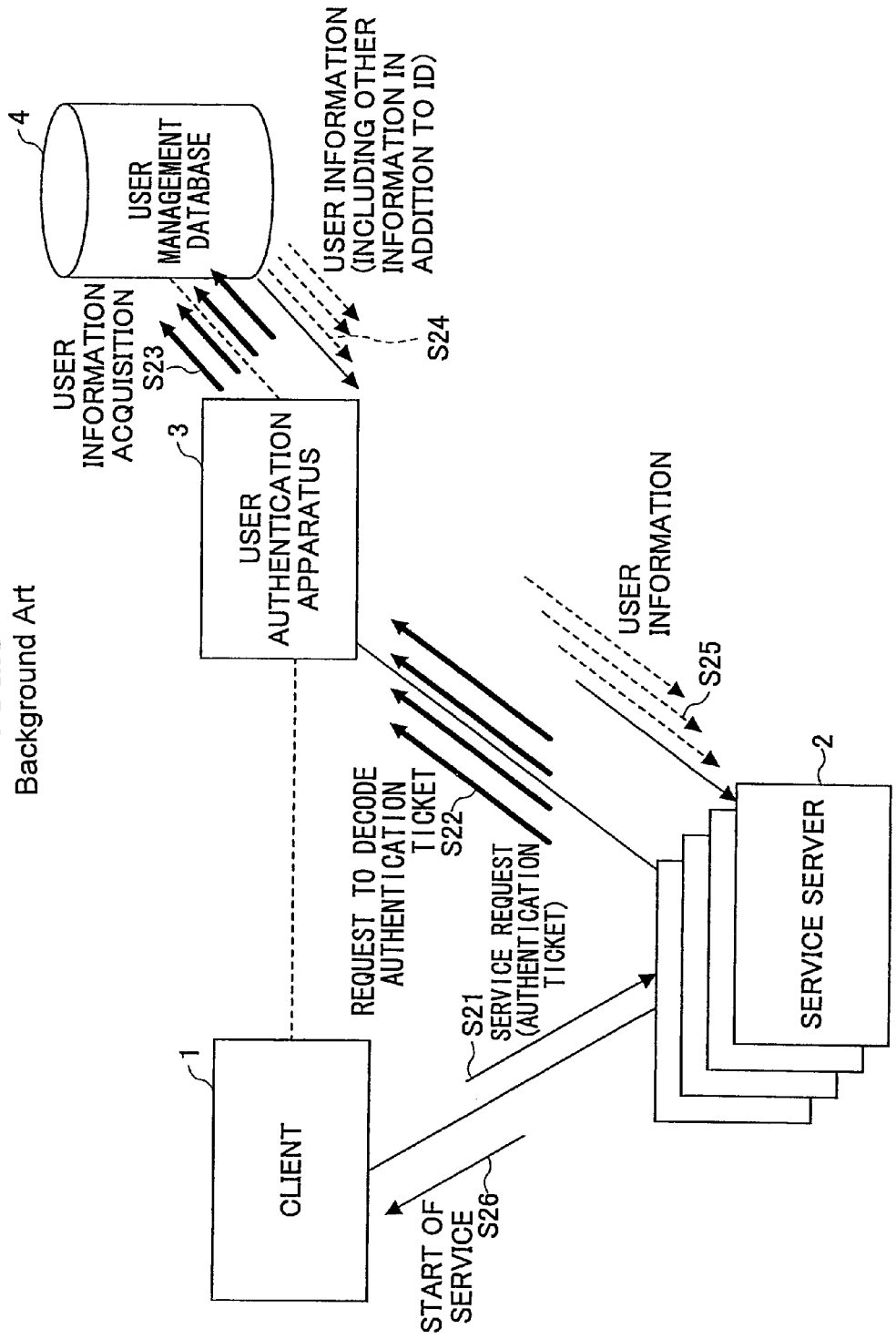
FIG. 3 is a drawing showing the way in which decoding requests to decode authentication tickets are frequently issued.
Figure 4:
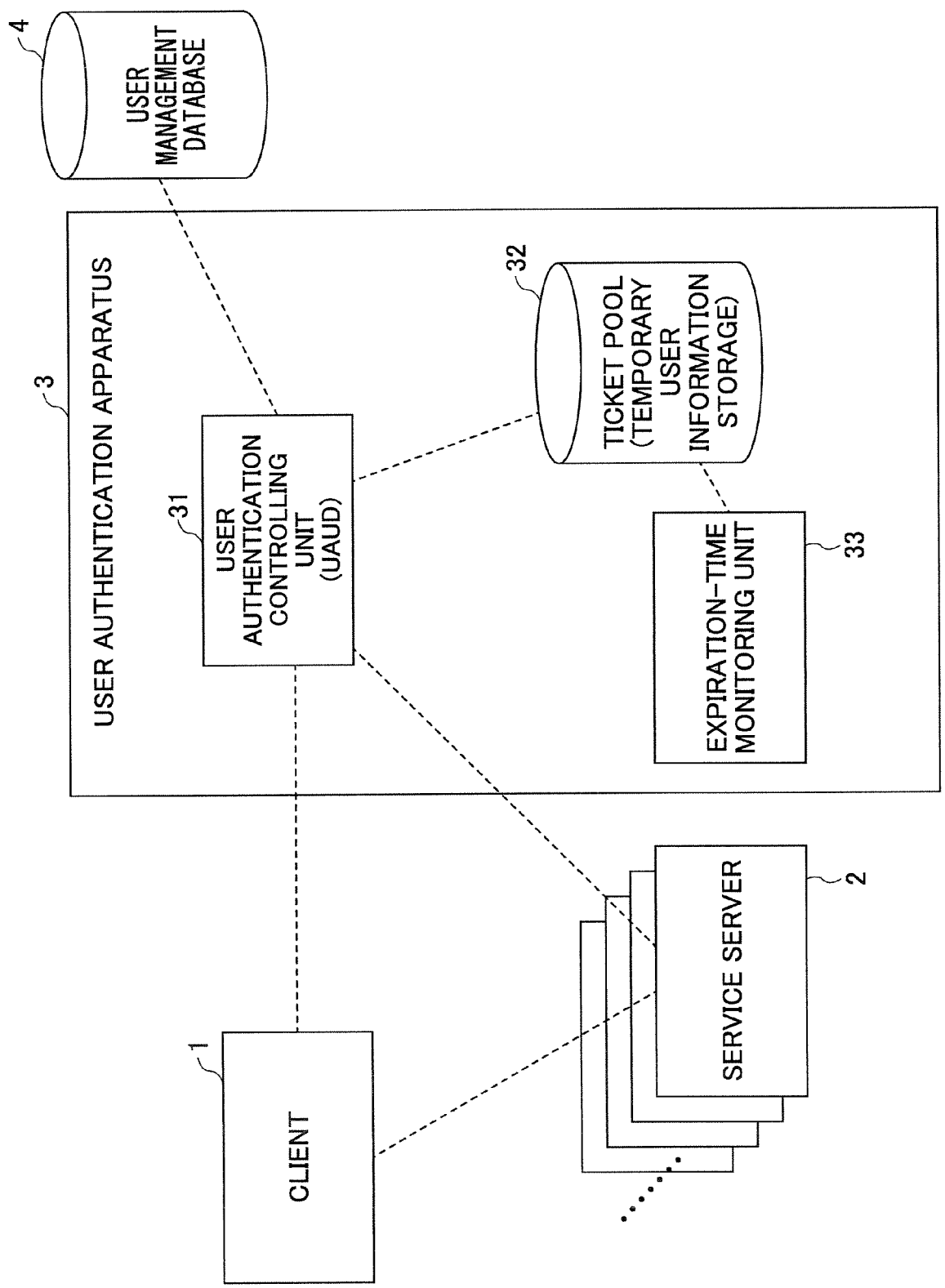
FIG. 4 is a drawing showing an example of the configuration of a system according to a first embodiment of the present invention.

FIG. 4 is a drawing showing an example of the configuration of a system according to a first embodiment of the present invention. The system shown in FIG. 4 includes a client 1 such as a PC (personal computer), a cellular phone, or a PDA (personal digital assistant) used by a user who is to receive a service, a plurality of service servers 2 providing services, a user authentication apparatus 3 for generating and decoding an authentication ticket, and a user management database 4 for managing user information. The user authentication apparatus 3 includes a user authentication controlling unit 31 for performing a main part of the process of generating and decoding an authentication ticket, a ticket pool (user information temporal storage unit) 32 for keeping user information for a limited time period under the control of the user authentication controlling unit 31, and an expiration-time monitoring unit 33 for monitoring the expiration time of an entry in the ticket pool 32 and deleting the entry accordingly.

Figure 5:
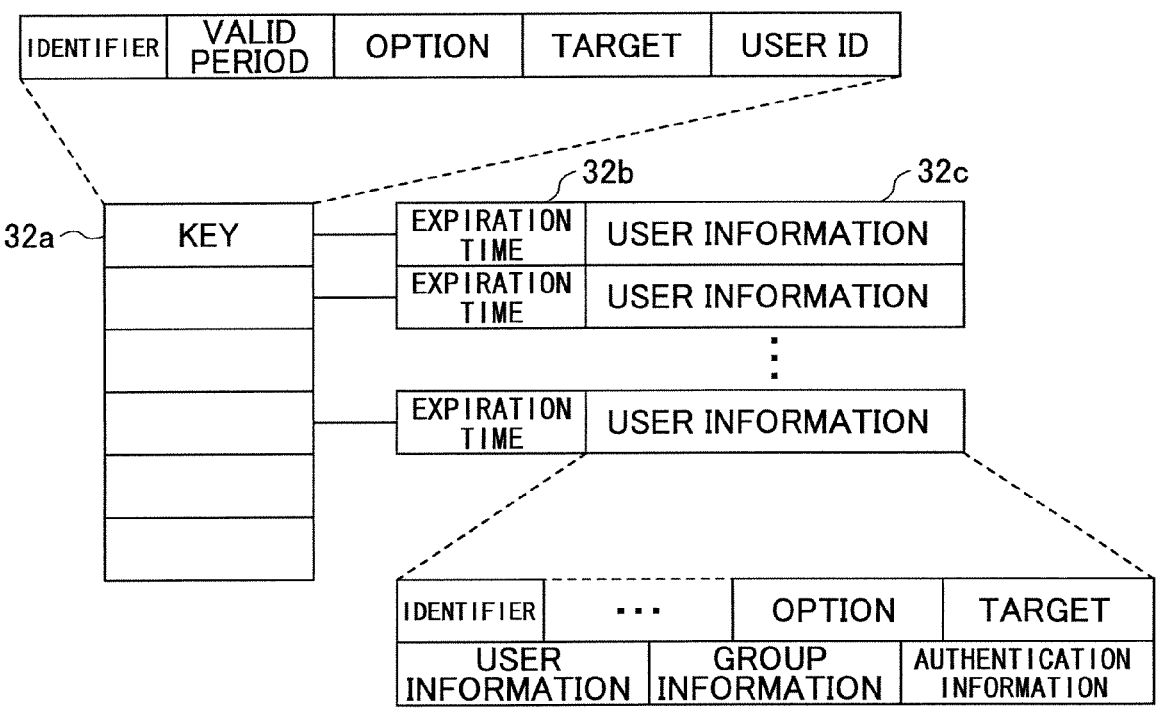
FIG. 5 is a drawing showing an example of the structure of a ticket pool according to the first embodiment.

FIG. 5 is a drawing showing the structure of the ticket pool 32 according to the first embodiment. The ticket pool 32 includes keys 32a for storing respective self-contained tickets, and also includes expiration times 32b and user information items 32c paired with the respective keys 32a. The expiration time 32b is separate from and independent of the valid period contained in the self-contained ticket, and has a value that is the date and time of creation of the authentication ticket plus a specified time period. The specified time period is set to a sufficiently short period (e.g., 30 seconds), which is within the range that can cope with the case in which decoding requests are frequently issued in a short interval, and which is not contrary to the intended purpose of the self-contained ticket that is to return user information at the time of the decoding process.

Figure 6:
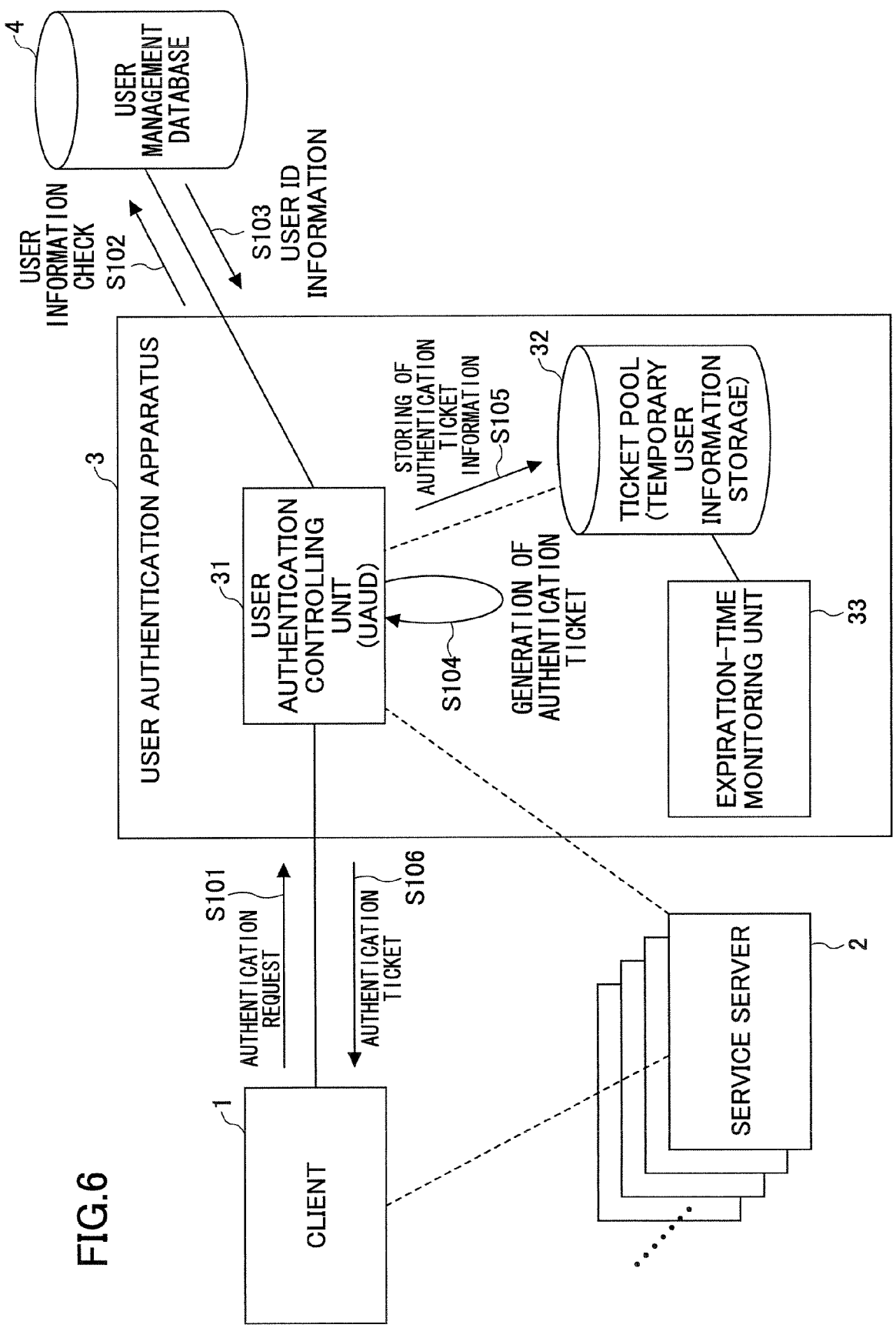
FIG. 6 is a drawing showing the flow of processes from an authentication request to the acquisition of an authentication ticket according to the first embodiment.

FIG. 6 is a drawing showing the flow of processes from an authentication request to the acquisition of an authentication ticket according to the first embodiment. In FIG. 6, prior to the receiving of services from a service server 2, the client 1 issues an authentication request to the user authentication controlling unit 31 of the user authentication apparatus 3 (step S101). In response, the user authentication controlling unit 31 checks user information with the user management database 4 (step S102). Upon confirmation, the user authentication controlling unit 31 obtains user information from the user management database 4 (step S103). This user information not only includes user ID information, but also includes all the information necessary at the time of decoding process.

Based on the user ID information contained in the user information, the user authentication controlling unit 31 generates an authentication ticket (step S104), and stores the user information in the ticket pool 32 such that the user information is associated with the authentication ticket and an expiration time (step S105). The user authentication controlling unit 31 then supplies the authentication ticket to the client 1 (step S106).

Figure 7:
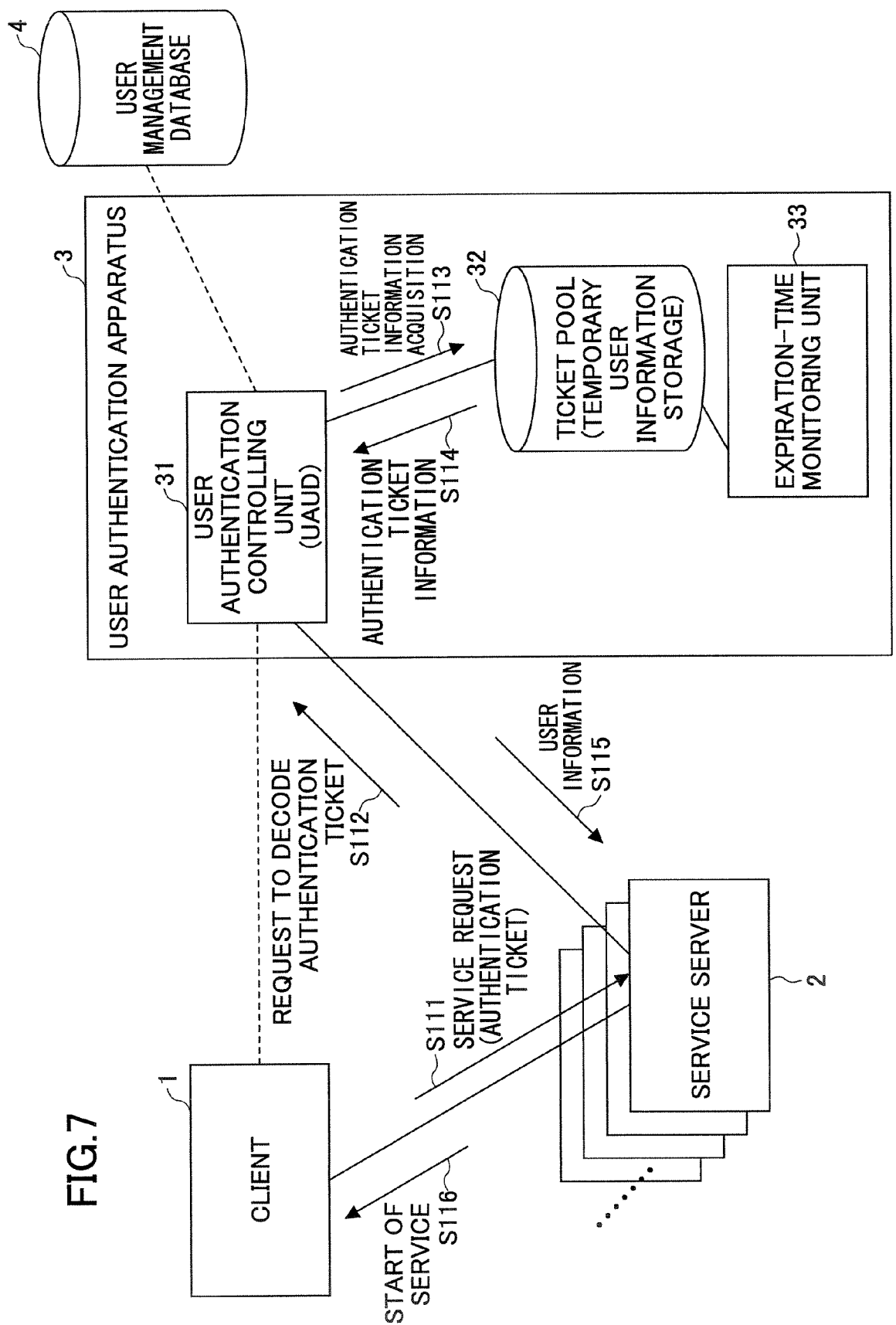
FIG. 7 is a drawing showing the flow of processes from a service request to the start of a service according to the first embodiment.

FIG. 7 is a drawing showing the flow of processes from a service request to the start of a service according to the first embodiment. In FIG. 7, the client 1 issues a service request together with an authentication ticket to a service server 2 (step S111). In response, the service server 2 issues a decoding request to the user authentication controlling unit 31 of the user authentication apparatus 3 to decode the authentication ticket (step S112).

The user authentication controlling unit 31 acquires the user information from the ticket pool 32 without accessing the user management database 4 (step S113, step S114), and supplies the user information to the service server 2 (step S115)

The service server 2 makes a decision about the access right regarding the relevant service based on the supplied user information so as to start providing the service (step S116).

Figure 8:
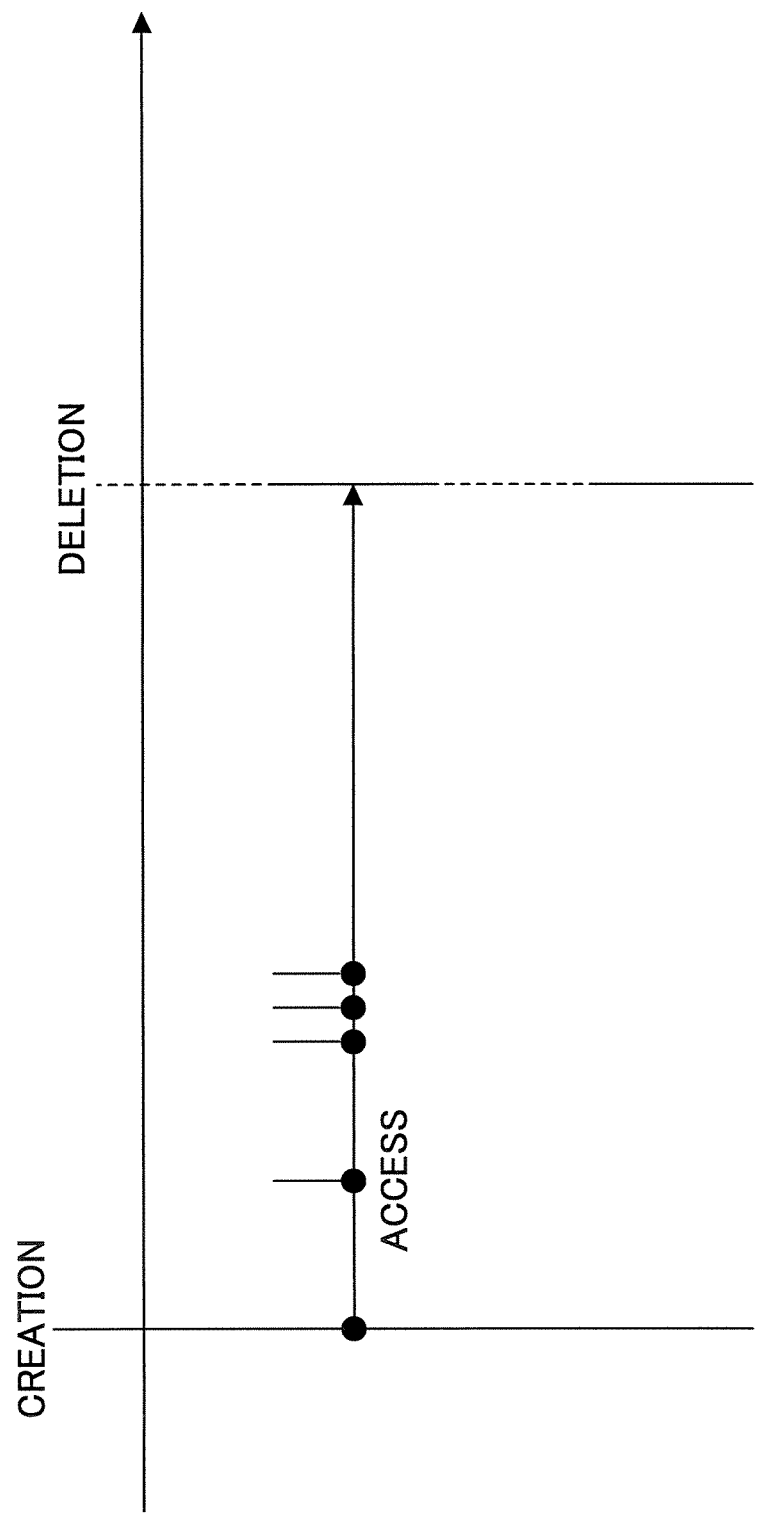
FIG. 8 is a drawing showing an example of the removal of user information and the like from a ticket pool according to the first embodiment.

In the mean time, the expiration-time monitoring unit 33 constantly or periodically compares the present time with the expiration time 32b of the user information stored in the ticket pool 32, and deletes or invalidates the user information that has expired by exceeding the expiration time. FIG. 8 is a drawing showing an example of the deletion of user information or the like stored in the ticket pool 32 according to the first embodiment. An authentication ticket is generated, and is accessed as many times as necessary, followed by being deleted when the specified time period passes from the date and time of the creation.

Figure 9:
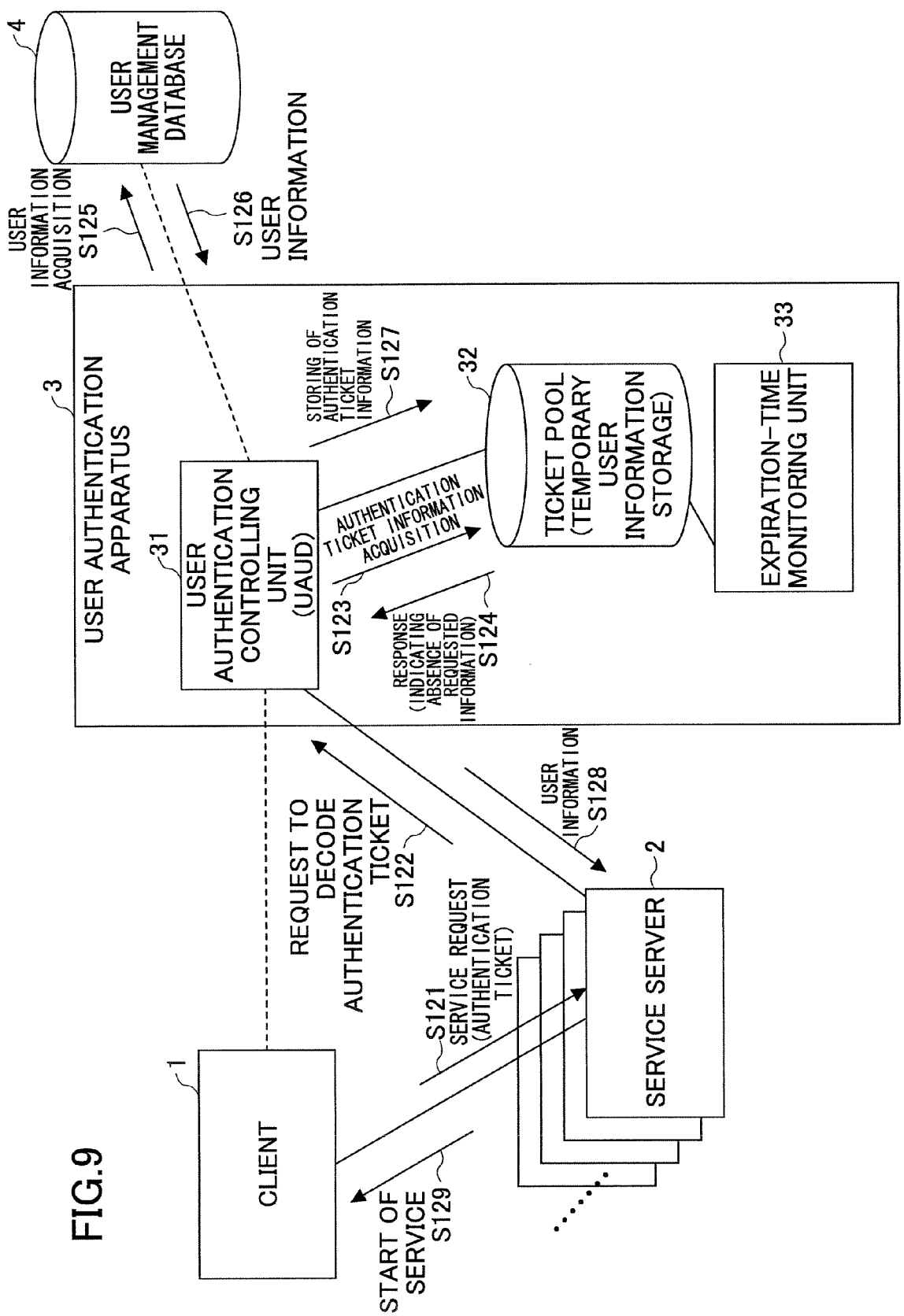
FIG. 9 is a drawing showing the flow of processes from a service request to the start of a service according to the first embodiment.

FIG. 9 is a drawing showing the flow of processes from a service request to the start of a service according to the first embodiment when the relevant authentication ticket has already been deleted. In FIG. 9, the client 1 issues a service request together with an authentication ticket to a service server 2 (step S121). In response, the service server 2 issues a decoding request to the user authentication controlling unit 31 of the user authentication apparatus 3 to decode the authentication ticket (step S122).

The user authentication controlling unit 31 attempts to acquire the user information from the ticket pool 32 (step S123, step S124), and acquires the user information instead from the user management database 4 since the relevant user information is not in existence (step S125, step S126).

The user authentication controlling unit 31 then stores the user information in the ticket pool 32 such that the user information is associated with the authentication ticket and the expiration time (step S127), and supplies the user information to the service server 2 (step S128).

The service server 2 makes a decision about the access right regarding the relevant service based on the supplied user information so as to start providing the service (step S129).

Figure 10:
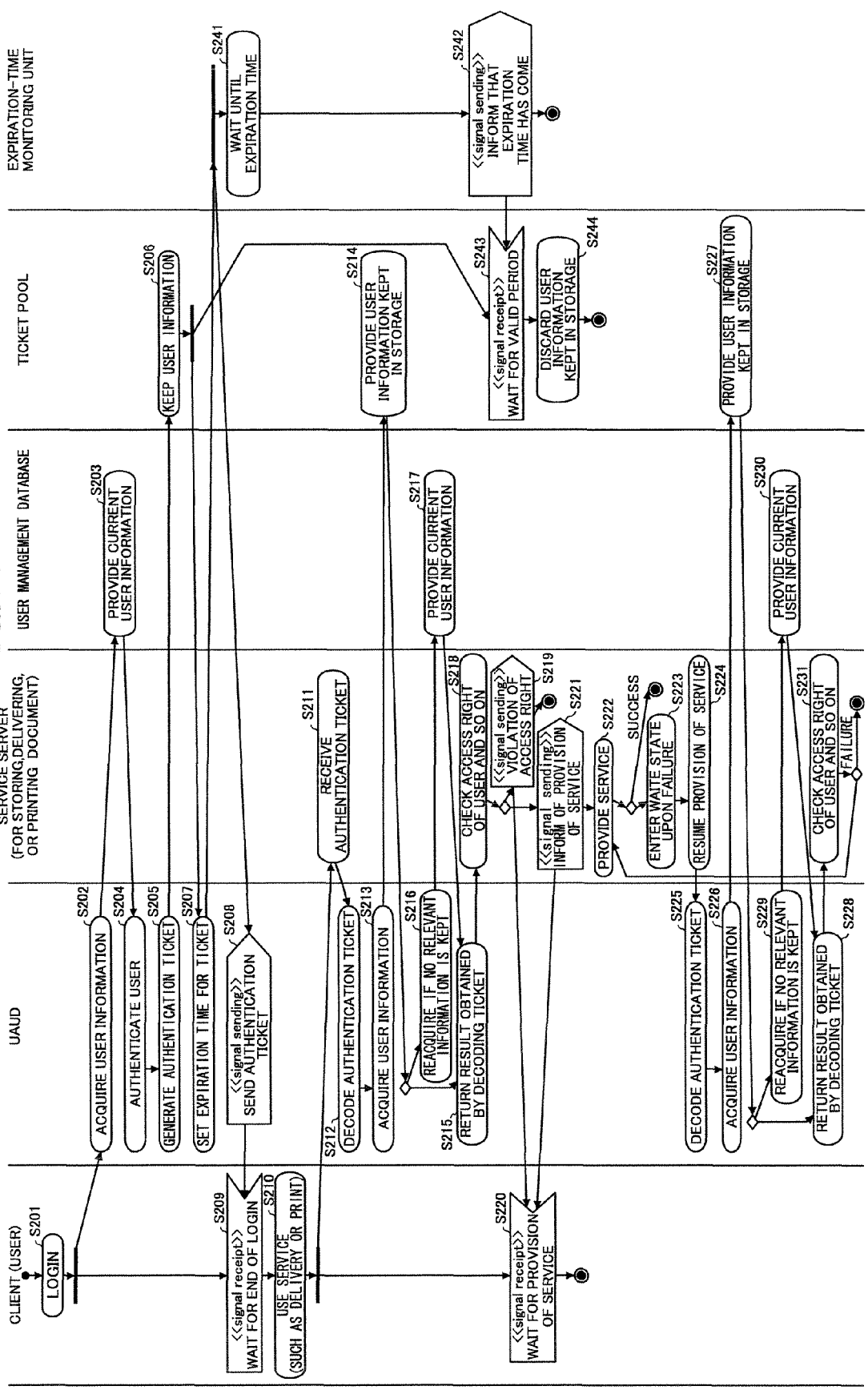
FIG. 10 is a flowchart showing an entirety of processes according to the first embodiment.

FIG. 10 is a flowchart showing the entire procedure of the first embodiment. S201 through S209 relate to the procedure from an authentication request to the acquisition of an authentication ticket. S210 through S231 concern the procedure from a service request to the start of a service. S241 through S244 concern the procedure for deleting user information or the like in the ticket pool 32.

As shown in the figure, user information is acquired preferentially from the ticket pool 32 in response to a decoding request requesting the decoding of an authentication ticket. Even when decoding requests are consecutively issued in a short interval, thus, a drop in performance can be prevented.

Moreover, user information is kept in storage together with the indication of the time relating to the time of information acquisition, and is deleted after the passage of a specified time period. With a proper setting of this period, user information with sufficient accuracy as existing at the time of a decoding request can be provided in accordance with the specification of a self-contained ticket while preserving the advantage of performance improvements in the case of multiple decoding requests occurring in a short time period.

Second Embodiment

Figure 11:
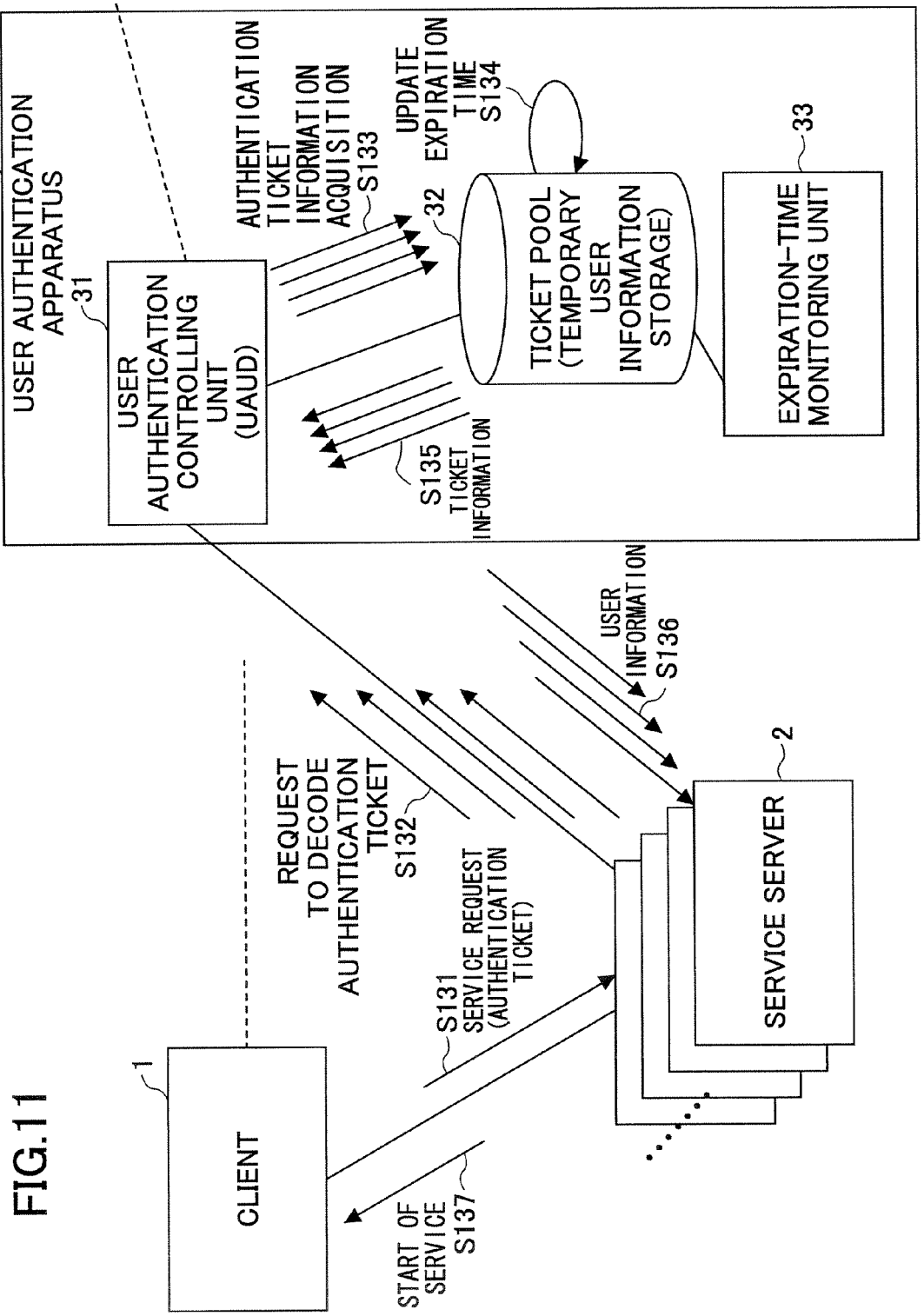
FIG. 11 is a drawing showing the flow of processes from a service request to the start of a service according to a second embodiment.

FIG. 11 is a drawing showing the flow of processes from a service request to the start of a service according to a second embodiment. In the second embodiment, provision is made to update the expiration time of user information stored in the ticket pool.

In the first embodiment, user information in the ticket pool 32 is disposed of after the passage of the specified time period regardless of whether decoding requests are being consecutively issued as part of a series of operations. Thereafter, the user information is acquired from the user management database 4 in response to a decoding request. This may create a situation in which the decoded information differs between the first half of the decoding process and the second half of the decoding process. When multiple decoding requests are consecutively made by a plurality of services, these services often constitute mutually related applications. In such a case, thus, it is preferable to obtain the same information as the decoded results. In the second embodiment, thus, the information about the expiration time is initialized each time the user information is acquired from the ticket pool 32.

In FIG. 11, the client 1 issues a service request together with an authentication ticket to a service server 2 (step S131). In response, the service server 2 issues a decoding request to the user authentication controlling unit 31 of the user authentication apparatus 3 to decode the authentication ticket (step S132). In this example, it is assumed that multiple decoding requests are consecutively issued by a plurality of services.

The user authentication controlling unit 31 acquires the user information from the ticket pool 32 (step S133, step S135), and updates the expiration time each time the user information is acquired (step S134).

The user authentication controlling unit 31 supplies the user information to the service servers 2 (step S136). The service servers 2 make a decision about the access right regarding the relevant service based on the supplied user information so as to start providing the service (step S137).

Figure 12:
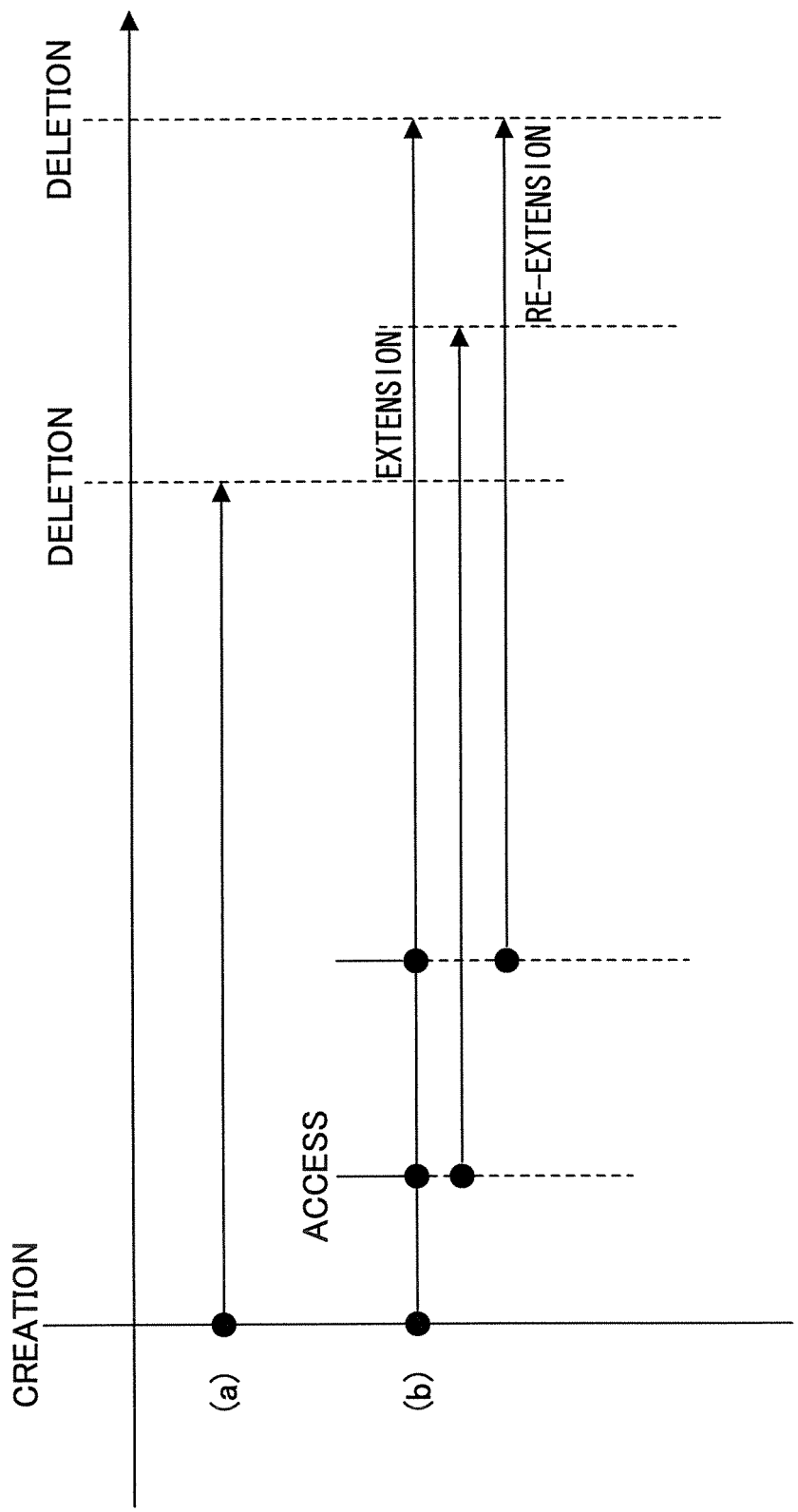
FIG. 12 is a drawing showing an example of the removal of user information and the like from a ticket pool according to the second embodiment.

FIG. 12 is a drawing showing an example in which user information and the like is deleted in the ticket pool 32 according to the second embodiment. In the first embodiment, an authentication ticket is deleted after the passage of a specified time period following the creation of the authentication ticket as shown in (a). In the second embodiment, on the other hand, the specified period restarts each time access is made, and the authentication ticket is deleted after the passage of the specified period following the last access.

In this manner, the expiration time is extended in response to the acquisition of data from the ticket pool 32, so that the user information in the ticket pool 32 will not be discarded while there is an ongoing series of decoding requests. This can avoid a situation in which the decoded information differs between the first half of the decoding process and the second half of the decoding process.

Third Embodiment

Figure 13:
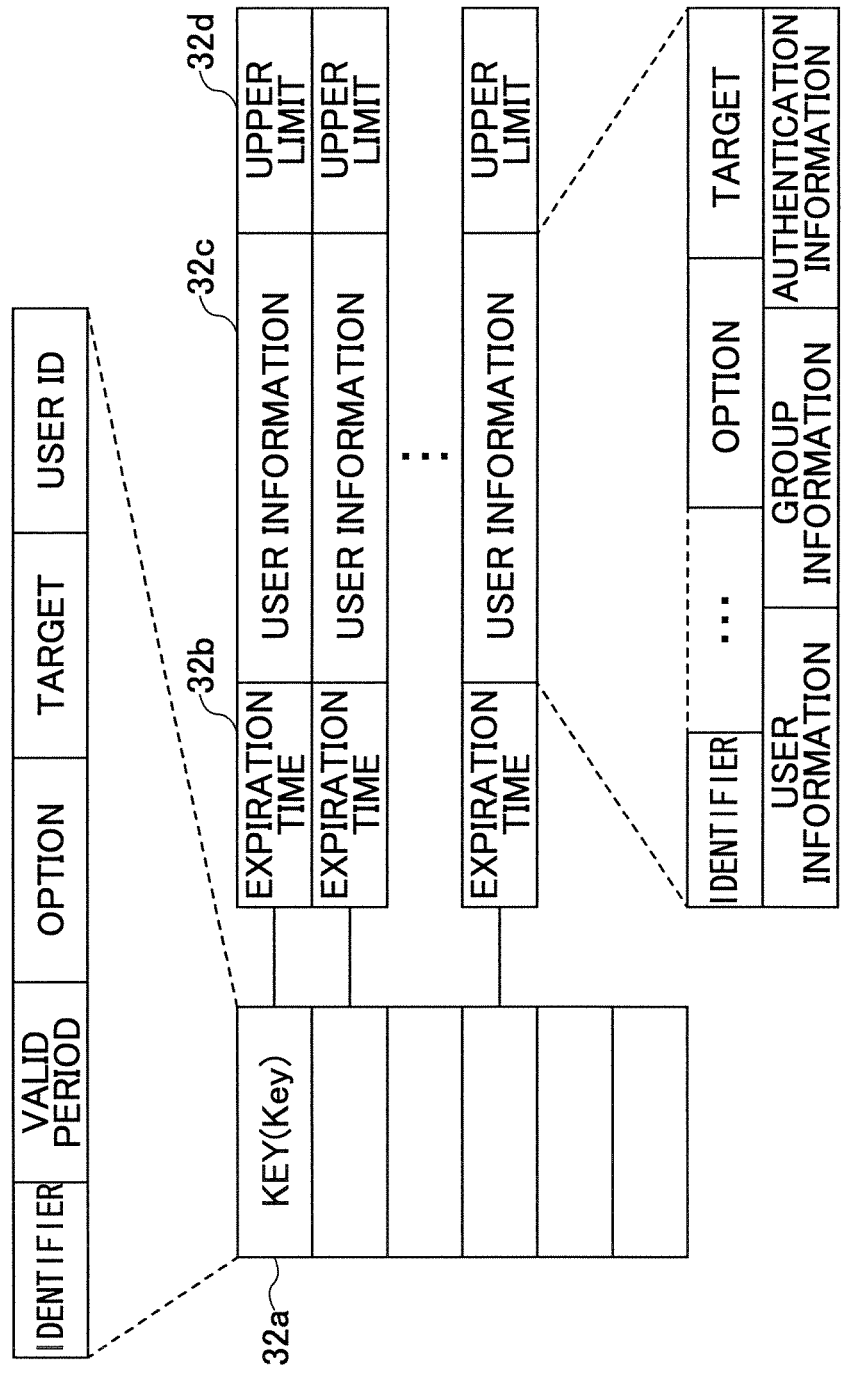
FIG. 13 is a drawing showing an example of the structure of a ticket pool according to a third embodiment of the present invention.

FIG. 13 is a drawing showing the structure of a ticket pool according to a third embodiment of the present invention. In the third embodiment, provision is made such that an upper limit is settable to an extension of the expiration time.

In the second embodiment, user information in the ticket pool 32 is never discarded if decoding requests continued to be issued at short intervals as in the case where decoding requests are congested. In such a case, there may never be a situation in which the user information is acquired from the user management database 4. Namely, the intended purpose of the self-contained ticket, i.e., the returning of user information as existing at the time of a decoding request, is significantly undermined. In the third embodiment, thus, the user information stored in the ticket pool 32 is managed together with an upper limit of an extension in addition to the expiration time.

In FIG. 13, the ticket pool includes the keys 32*a* for storing respective self-contained tickets, the expiration times 32*b* and user information items 32*c* paired with the respective keys 32*a*, and upper limits 32*d* indicative of a limit of an extension of the expiration time. The upper limit 32*d* is initialized in response to the acquisition of the user information from the user management database 4.

Figure 14:
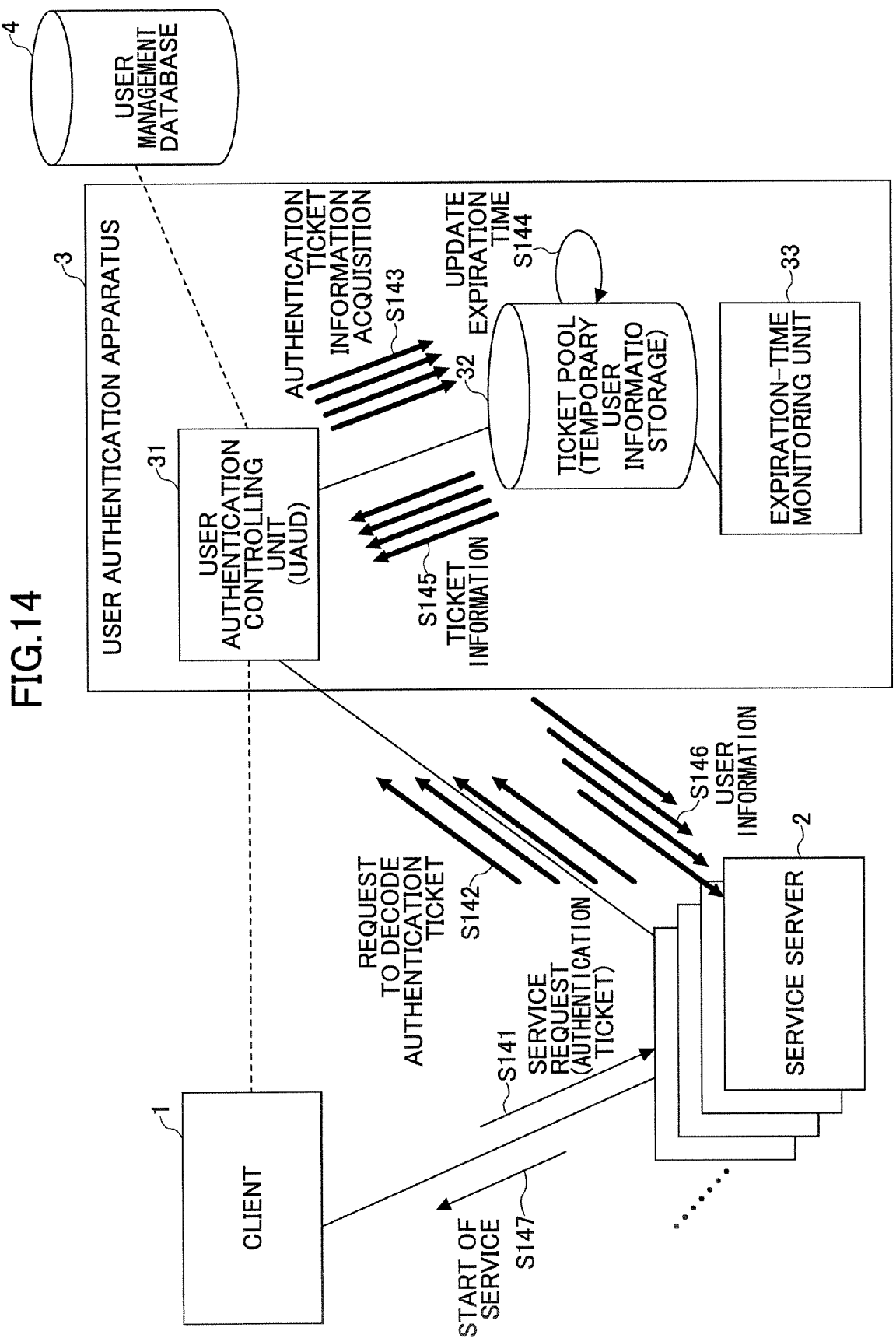
FIG. 14 is a drawing showing the flow of processes from a service request to the start of a service according to the third embodiment.

FIG. 14 is a drawing showing the flow of processes from a service request to the start of a service according to the third embodiment. In FIG. 14, the client 1 issues a service request together with an authentication ticket to a service server 2 (step S141). In response, the service server 2 issues a decoding request to the user authentication controlling unit 31 of the user authentication apparatus 3 to decode the authentication ticket (step S142). In this example, it is assumed that multiple decoding requests are consecutively issued by a plurality of services.

The user authentication controlling unit 31 acquires the user information from the ticket pool 32 (step S143, step S145), and updates the expiration time each time the user information is acquired (step S144). However, an extension of the expiration time is limited by the upper limit 32*d*.

The user authentication controlling unit 31 supplies the user information to the service servers 2 (step S146). The service servers 2 make a decision about the access right regarding the relevant service based on the supplied user information so as to start providing the service (step S147).

Figure 15:
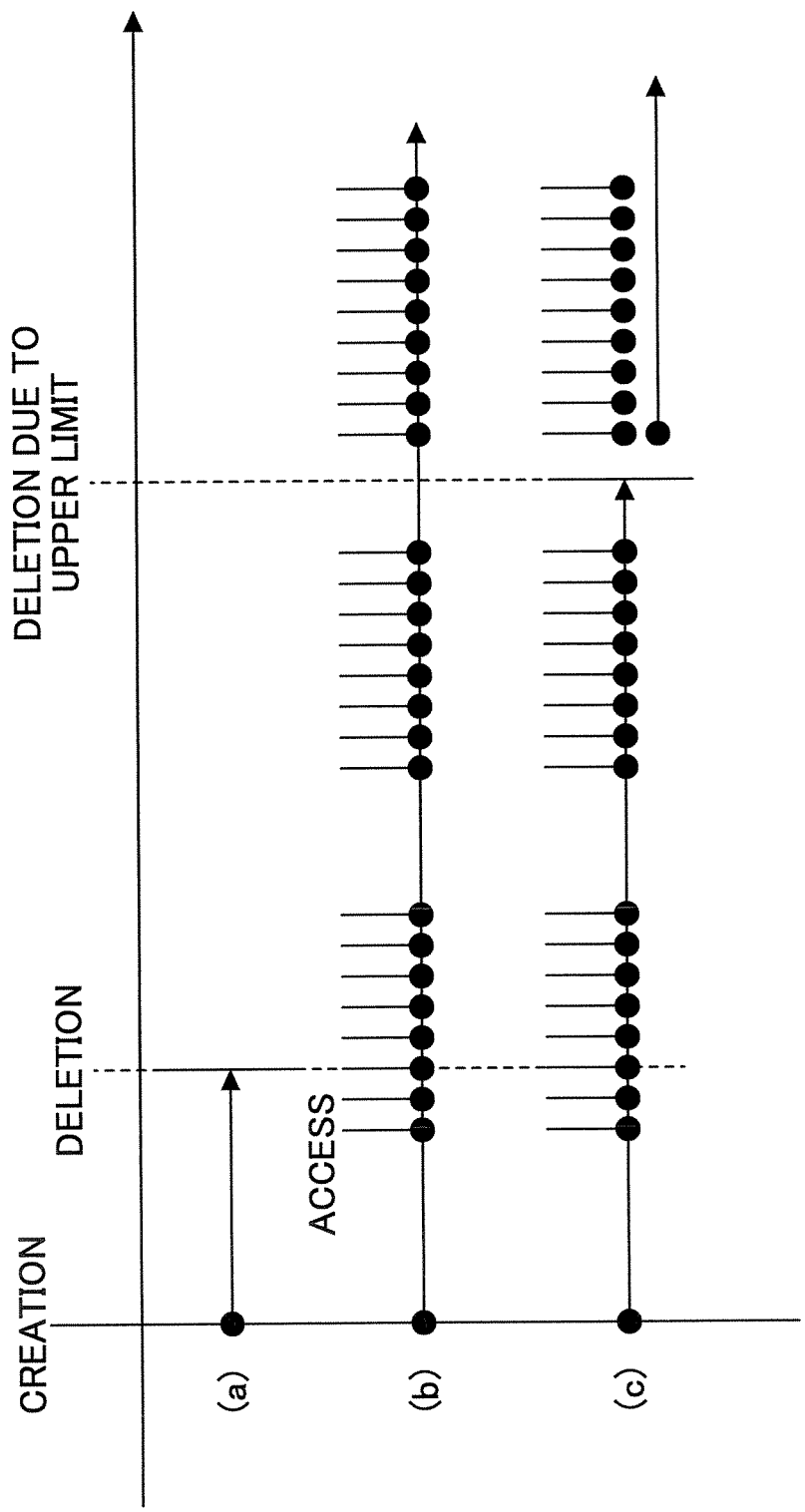
FIG. 15 is a drawing showing an example of the removal of user information and the like from a ticket pool according to the third embodiment.

FIG. 15 is a drawing showing an example in which user information and the like is deleted in the ticket pool 32 according to the third embodiment. In the first embodiment, an authentication ticket (user information to be exact) is deleted after the passage of a specified time period following the creation of the authentication ticket as shown in (a). In the second embodiment, the authentication ticket is not deleted as long as there are ongoing consecutive accesses as shown in (b). In the third embodiment, on the other hand, the authentication ticket is deleted after the passage of a predetermined time period from the last access or at the time corresponding to the upper limit, whichever is earlier, and new user information is retrieved in response to a following decoding request.

In this manner, provision is made to set an upper limit to an extension of the expiration time. Even when decoding requests are congested, therefore, it is possible to avoid undermining the intended purpose of the self-contained ticket, i.e., the ability to return user information as existing at the time of a decoding request.

Example of Collaboration between Service Servers

The service servers 2 described above are separate from and independent of each other, and a service server 2 can be added or removed as desired. In order to implement certain application, a plurality of service servers 2 may be operated in collaboration with each other.

Depending on which service servers 2 collaborate for a given application, different control may be performed. Three example patterns are shown in the following:

(1) a case in which the client defines the collaboration;
(2) a case in which a third service server defining the application defines the collaboration; and
(3) a case in which the authentication ticket includes the definition of an activated service.

Figure 16:
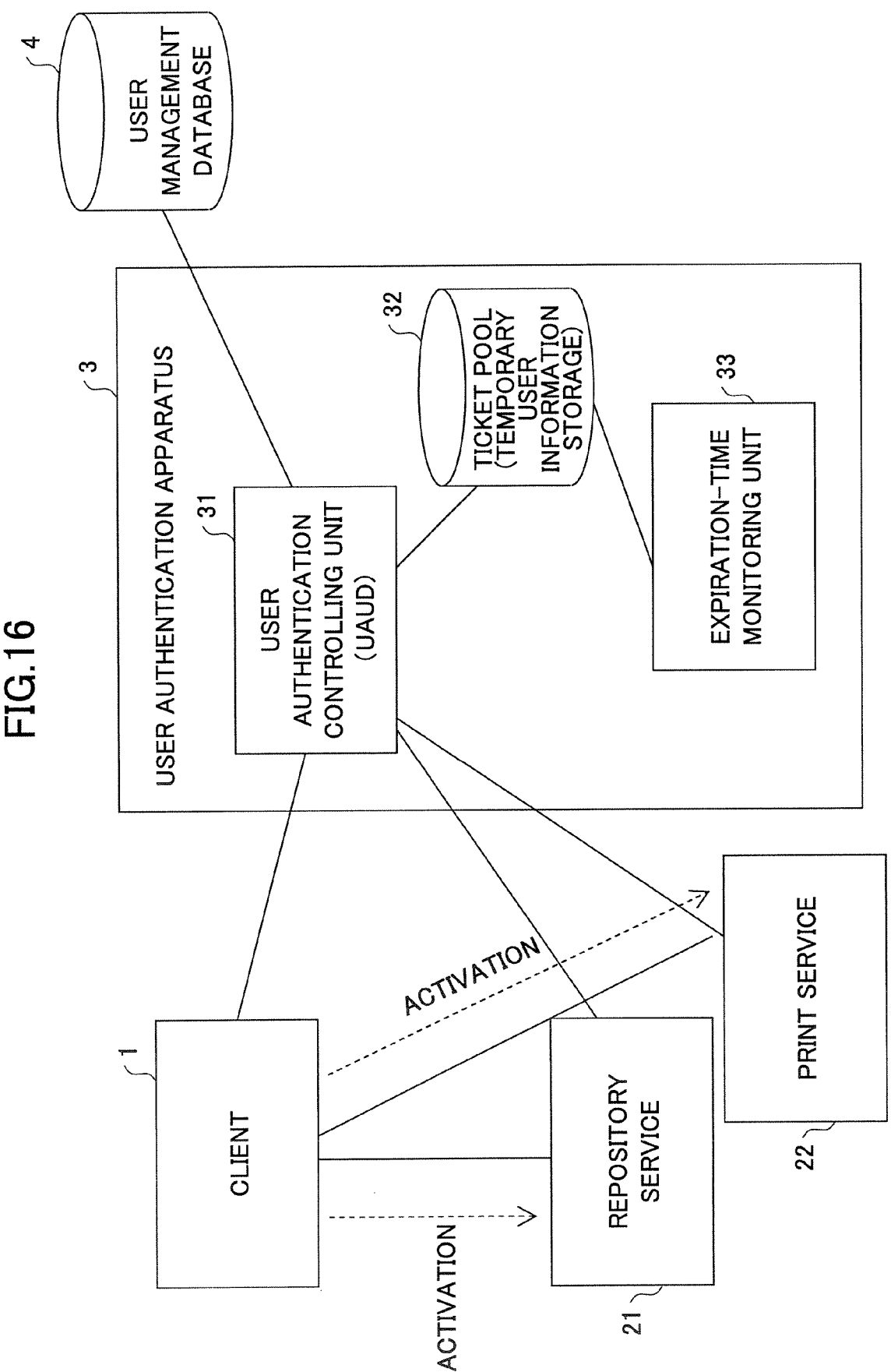
FIG. 16 is a drawing showing an example of the collaboration of service servers.

FIG. 16 is a drawing showing an example of the collaboration of service servers when the client defines the collaboration. In FIG. 16, when the client 1 is to print a document, a repository service 21 and a print service 22 are activated under the control of the client 1. Each of the repository service 21 and the print service 22 uses the user authentication apparatus 3 to decode the respective authentication ticket in order to make a decision about the access right regarding their respective service. As a result, the user authentication apparatus 3 decodes the authentication tickets of the same user multiple times in a short interval.

Figure 17:
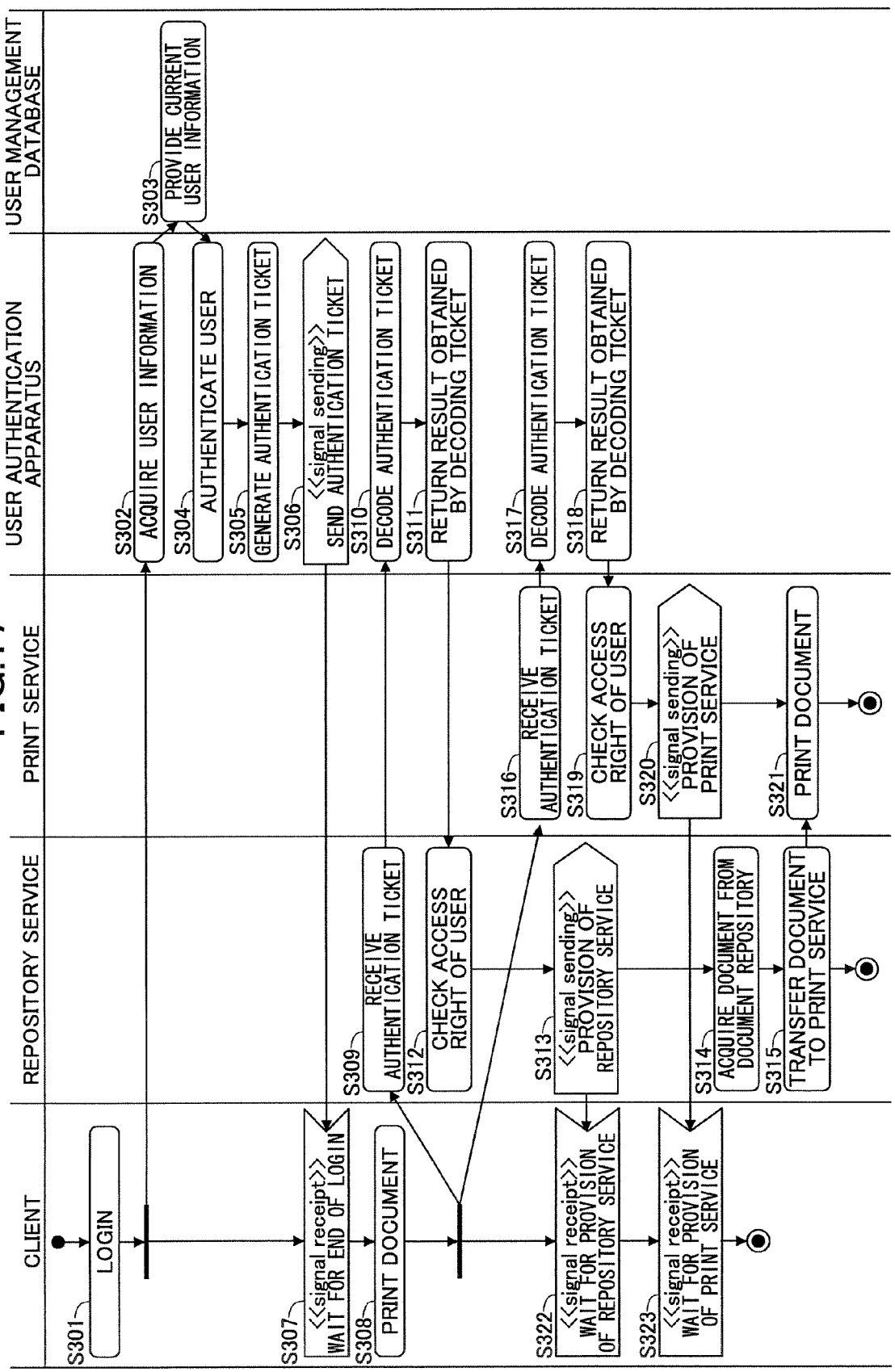
FIG. 17 is a drawing showing an example of processes performed in the collaboration of service servers.

FIG. 17 is a sequence diagram showing an example of processes performed in this case. S301 through S307 concern the process of acquiring an authentication ticket, S308 the process of instructing to print a document by the client 1, S309 through S315 the process performed by the repository service 21, S316 through S321 the process performed by the print service 22, and S322 and S323 the process of waiting services by the client 1. At S309 and S316, authentication tickets are supplied to the repository service 21 and the print service 22 simultaneously. Alternatively, arrangement may be made such that an authentication ticket is supplied to the print service 22 after the repository service 21 acquires the relevant document.

Figure 18:
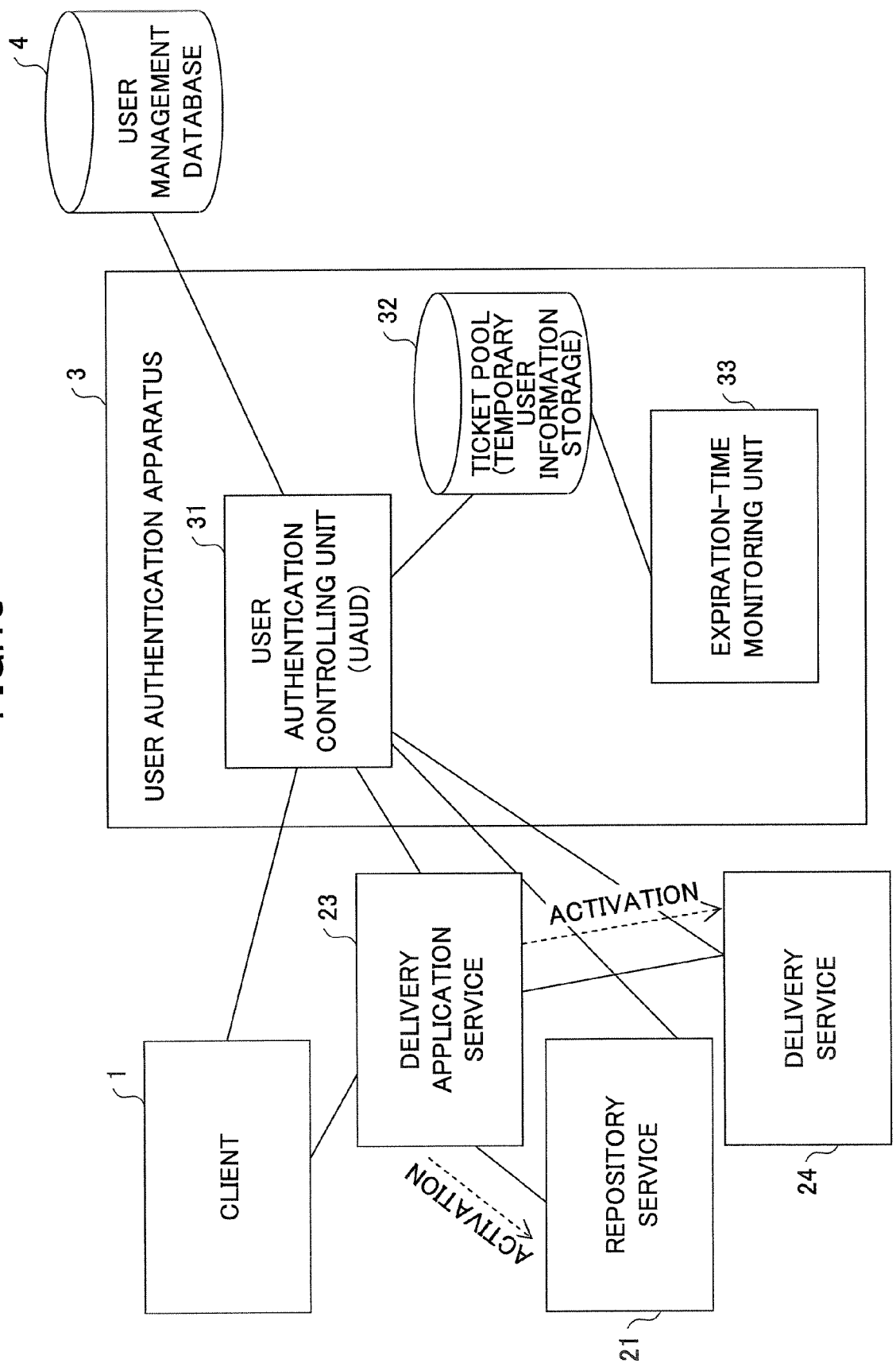
FIG. 18 is a drawing showing an example of the collaboration of service servers.

FIG. 18 is a drawing showing an example of the collaboration of service servers when a third service server defining an application defines the collaboration. In FIG. 18, when the client 1 is to deliver a document, the repository service 21 and a delivery service 24 are activated under the control of a delivery application service 23 so as to decode the authentication tickets regarding their respective services. Provision may be made such that the delivery application service 23 decodes the supplied application tickets. In this case, the decoding results may be taken into account to restrict the subordinate service servers. The delivery service 24 resumes delivery after an interval period upon a delivery failure. This action can also be switched according to the decoding results. After the resumption of delivery, the user information returned upon the decoding of the authentication ticket is current user information.

Figure 19:
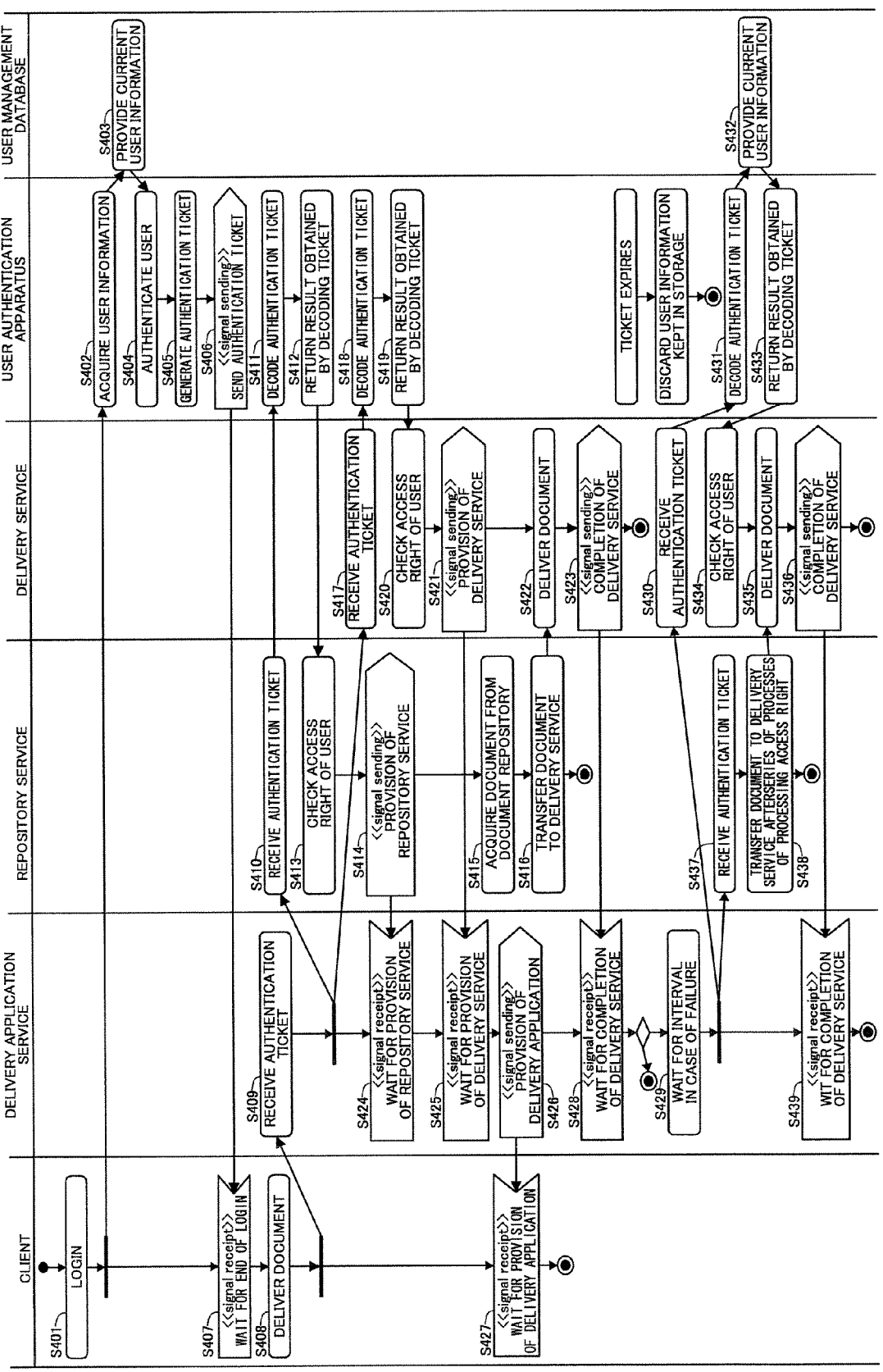
FIG. 19 is a drawing showing an example of processes performed in the collaboration of service servers.

FIG. 19 is a sequence diagram showing an example of processes performed in this case. S401 through S407 concern the process of acquiring an authentication ticket, S408 the process of instructing to deliver a document by the client 1, S409 through S428 the process performed by the repository service 21 and the delivery service 24 under the control of the delivery application service 23, S429 through S439 the delivery resumption process performed upon a delivery failure. At S410 and S417, authentication tickets are supplied to the repository service 21 and the print service 22 simultaneously. Alternatively, arrangement may be made such that an authentication ticket is supplied to the print service 22 after the repository service 21 acquires the relevant document.

Figure 20:
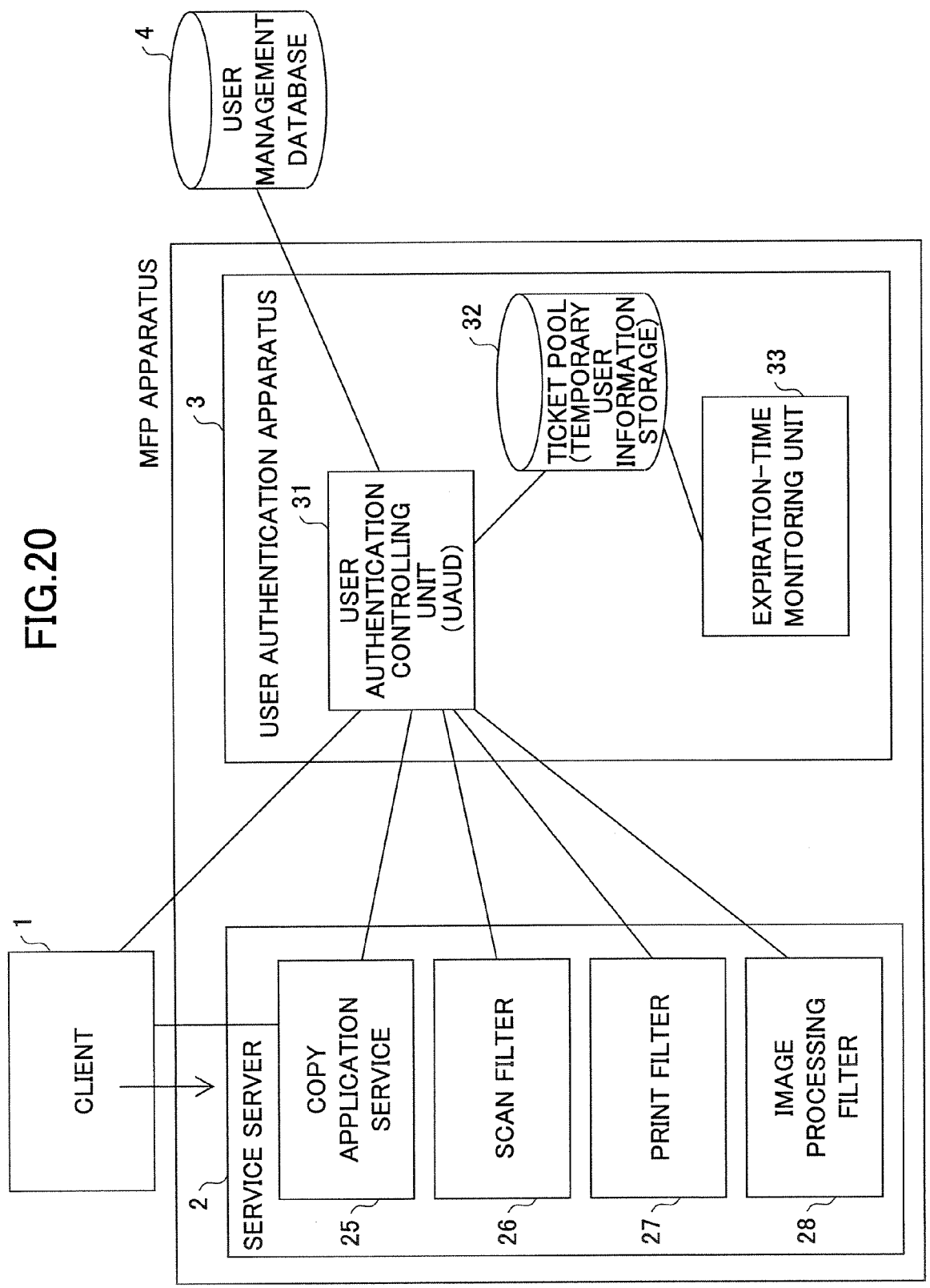
FIG. 20 is a drawing showing an example of the collaboration of service servers.

FIG. 20 is a drawing showing an example of the collaboration of service servers when an authentication ticket includes the definition of activated services. FIG. 20 is directed to an example in which the service server 2 and the user authentication apparatus 3 are provided inside an MFP (multi-function printer). When a copy is to be made, for example, a scan filter 26, a print filter 27, and an image processing filter 28 are activated as the functions to implement a copy application service 25. When the types of usable filters are limited on a user-specific basis for each user of the client 1, an authentication ticket may include relevant information (indicative of the filter types that can be activated), thereby specifying services that can be activated.

Figure 21:
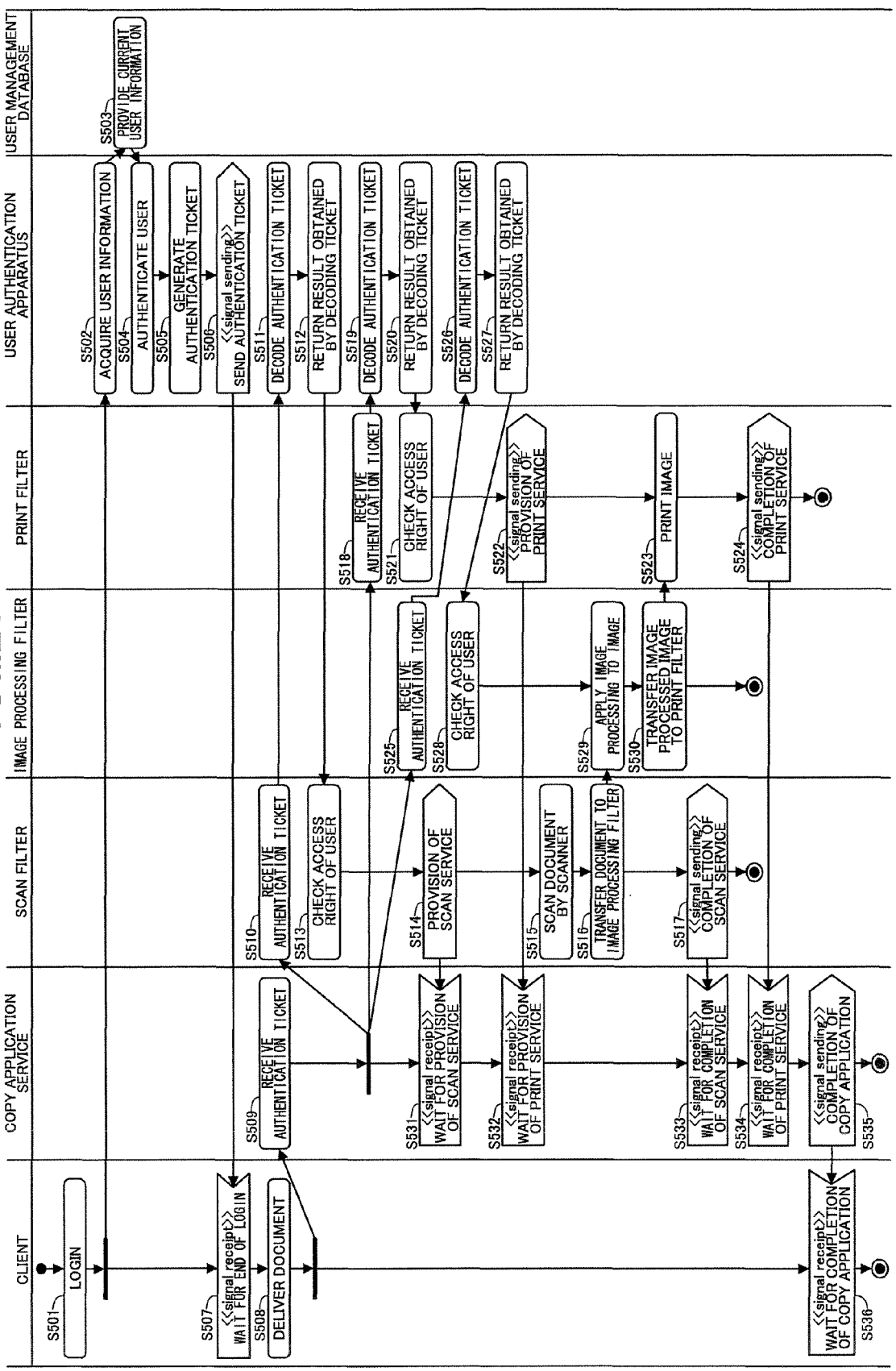
FIG. 21 is a drawing showing an example of processes performed in the collaboration of service servers.

FIG. 21 is a sequence diagram showing an example of processes performed in this case. Through the process of acquiring an authentication ticket at steps S501 through S507, an authentication ticket that defines types of services usable by a user is issued. S508 concerns the process of instructing to deliver a document by the client 1, and S509 though S535 concern the processes performed by the scan filter 26, the print filter 27, and the image processing filter 28 under the control of the copy application service 25. S536 concerns the process of waiting for a completion.

Embodiments of the present invention have been described heretofore for the purpose of illustration. The present invention is not limited to these embodiments, but various variations and modifications may be made without departing from the scope of the present invention. The present invention should not be interpreted as being limited to the embodiments that are described in the specification and illustrated in the drawings.

The present application is based on Japanese priority applications No. 2005-336871 filed on Nov. 22, 2005 and No. 2006-304257 filed on Nov. 9, 2006, with the Japanese Patent Office, the entire contents of which are hereby incorporated by reference.

What is claimed is:

1. An authentication ticket processing apparatus comprising:
an authentication ticket generator generating an authentication ticket including a valid period for a client in response to an authentication request;
a supplier supplying relevant user information including user ID information in response to a decoding request from a server regarding an authentication ticket associated with a service request when the client is to receive a series of services from a plurality of servers that are independently operable;
a memory storing and managing user information received from a user management database, the memory storing an expiration time period corresponding to a time period from receipt of information and providing access to the user management database, the expiration time period being loaded by the authentication ticket generator into the memory;
a user authentication controller checking, via a processor and when there is a need to acquire user information in response to the decoding request from the server, whether user information corresponding to the decoding request is stored in the memory, and acquiring the corresponding user information from the memory when the corresponding user information is stored in the memory;
a controller controlling data stored in the memory and deleting user information stored in the memory upon passage of the expiration time period,
wherein
the valid period is separate from and independent of the expiration time period,
the memory stores and associates the user information with information indicative of a time of receipt of information, the time of receipt of information being a time at which the user information is received from the user management database, and
the expiration time period is extended in response to an access of data of the memory.

2. The authentication ticket processing apparatus according to claim 1, wherein the corresponding user information is acquired from the user management database instead of the memory when the corresponding user information is not stored in the memory.

3. The authentication ticket processing apparatus according to claim 1, wherein the extension of the expiration time period is restricted to be within a predetermined time limit from the time of receipt of information.

4. The authentication ticket processing apparatus according to claim 1, wherein the client defines a collaboration with the plurality of servers.

5. The authentication ticket processing apparatus according to claim 1, wherein one of the plurality of servers defines an application that defines a collaboration with the plurality of servers.

6. The authentication ticket processing apparatus according to claim 1, wherein authentication ticket includes a definition of services that defines a collaboration with the plurality of servers.

7. An authentication ticket processing method comprising:

generating, at an authentication ticket generator, an authentication ticket including a valid period for a client in response to an authentication request;

supplying, at a supplying unit, relevant user information including user ID information in response to a decoding request from a server regarding an authentication ticket associated with a service request when the client is to receive a series of services from a plurality of servers that are independently operable;

storing and managing, in a memory, user information received from a user management database, the memory storing an expiration time period corresponding to a time period from receipt of information and providing access to the user management database, the expiration time period being loaded by the authentication ticket generator into the memory;

storing and associating, at the memory, the user information with information indicative of a time of receipt of information, the time of receipt of information being a time at which the user information is received from the user management database;

checking, at a user authentication controlling unit via a processor, when there is a need to acquire user information in response to the decoding request from the server, whether user information corresponding to the decoding request is stored in the memory;

acquiring, at the user authentication controlling unit, the corresponding user information from the memory when the corresponding user information is stored in the memory; and deleting, at a control unit, the user information stored in the memory upon passage of the expiration time period, wherein the valid period is separate from and independent of the expiration time period, and the expiration time period is extended in response to an access of data of the memory.

8. The authentication ticket processing method according to claim 7, wherein the corresponding user information is acquired from the user management database instead of the memory when the corresponding user information is not stored in the memory.

9. The authentication ticket processing method according to claim 7, wherein the extension of the expiration time period is restricted to be within a predetermined time limit from the time of receipt of information.

10. The authentication ticket processing method according to claim 7, further comprising:

defining a collaboration with the plurality of servers from an instruction by the client.

11. The authentication ticket processing method according to claim 7, further comprising:

defining a collaboration with the plurality of servers from an application defined by one of the plurality of servers.

12. The authentication ticket processing method according to claim 7, further comprising:

defining a collaboration with the plurality of servers from a definition of services included with the authentication ticket.

* * * * *